United States Patent
Oh et al.

(10) Patent No.: US 11,381,489 B1
(45) Date of Patent: Jul. 5, 2022

(54) APPARATUS AND METHOD FOR TRACKING DATA IN EDGE CLOUD ENVIRONMENT

(71) Applicant: Penta Security Systems Inc., Seoul (KR)

(72) Inventors: Jin Hyeok Oh, Gwangmyeong-si (KR); Myung Woo Chung, Seoul (KR); Sang Gyoo Sim, Seoul (KR); Duk Soo Kim, Seoul (KR); Seok Woo Lee, Seoul (KR)

(73) Assignee: Penta Security Systems Inc., Seoul (KR)

( * ) Notice: Subject to any disclaimer, the term of this patent is extended or adjusted under 35 U.S.C. 154(b) by 0 days.

(21) Appl. No.: 17/537,098

(22) Filed: Nov. 29, 2021

(30) Foreign Application Priority Data

Nov. 12, 2021 (KR) .......................... 10-2021-0155584

(51) Int. Cl.
*G06F 15/173* (2006.01)
*H04L 43/10* (2022.01)
*H04L 67/10* (2022.01)

(52) U.S. Cl.
CPC .............. *H04L 43/10* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 7,493,598 B1* | 2/2009 | Craggs | G06F 11/3636 717/124 |
| 10,038,604 B2* | 7/2018 | Ouyang | H04L 41/08 |
| 2007/0198487 A1* | 8/2007 | Masuda | G06F 16/93 |
| 2007/0239802 A1* | 10/2007 | Razdow | G06F 16/93 |
| 2022/0004562 A1* | 1/2022 | Watanabe | G06F 16/2379 |

* cited by examiner

*Primary Examiner* — Quang N Nguyen
(74) *Attorney, Agent, or Firm* — Broadview IP Law, PC

(57) ABSTRACT

A data tracking method, which is performed by a data tracking apparatus in an edge cloud environment including at least one edge node communicating with an end device and a central cloud, includes receiving data from the end device by a first edge node, creating, by the first edge node, a tracing history and distributing the data to a plurality of edge nodes so as to allow the plurality of edge nodes to create tracing histories, transmitting the created tracing histories to the central cloud by the first edge node and the plurality of edge nodes, and verifying, by the central cloud, linkability of the tracing histories transmitted to the central cloud, storing the tracing histories, analyzing the tracing histories, and providing a data tracking function.

6 Claims, 15 Drawing Sheets

APPARATUS AND METHOD FOR TRACKING DATA IN EDGE CLOUD ENVIRONMENT

CROSS-REFERENCE TO RELATED APPLICATION(S)

This application claims priority to Korean Patent Application No. 2021-0155584 filed on Nov. 12, 2021 in the Korean Intellectual Property Office (KIPO), the entire contents of which are hereby incorporated by reference.

BACKGROUND

1. Technical Field

Example embodiments of the present invention relate to an apparatus and method for tracking data in an edge cloud environment.

2. Related Art

An edge cloud refers to a technique for providing an information service to a terminal using edge computing technology used as data emerged as a core element of the fourth industrial revolution is being used in various manners.

However, when there is a data request between edge clouds, a central cloud, which is a central processing server, handles the data request, but a bottleneck phenomenon occurs in the central cloud when there are a large number of data requests between edge clouds. This problem also occurs in an existing cloud environment, and a response time to a data request increases and data is difficult to process in real time due to the bottleneck phenomenon.

In addition, data is difficult to manage according to the importance thereof in the edge cloud environment. Furthermore, the edge cloud environment is vulnerable to attacks (e.g., ransomware, etc.) aimed to alter data.

When all pieces of data between edge nodes are backed up to fix the problems, there may be limitation to the edge nodes having limited resources. In addition, when backup data of the central cloud is damaged, there is no way to recover the backup data.

In this regard, "Method and Apparatus for Distributing and Storing Data" (Korean Patent Application No. 10-2020-0143083) (Related art document 1), which is an earlier application filed in the name of the applicant of the present invention, defines a method of distributing and storing data between edge nodes to guarantee the availability of the data and discloses a method of distributing and storing the same data in a plurality of edge nodes.

However, an existing edge cloud environment has limitations in that network traffic increases unnecessarily and hacking and leaking risks increase due to the lack of a technique for distributing, storing and managing data, and thus, it is necessary to secure security for a whole data lifecycle process, monitor whether data is provided or shared without permission, monitor whether a procedure of providing and sharing data is observed, and monitor a data deletion verification process.

SUMMARY

To address the above-described problems, example embodiments of the present invention provide an apparatus and method for tracking data in an edge cloud environment, which are capable of preventing problems due to the lack of a data tracking technique in the edge cloud environment, an unnecessary increase in network traffic, and hacking and leaking of data due to the lack of a technique for distributing, storing and managing data.

In some example embodiments, a data tracking method performed by a data tracking apparatus in an edge cloud environment includes at least one edge node communicating with an end device and a central cloud, the data tracking method including: receiving data from the end device by a first edge node; creating, by the first edge node, a tracing history and distributing the data to a plurality of edge nodes so as to allow the plurality of edge nodes to create tracing histories; transmitting the created tracing histories to the central cloud by the first edge node and the plurality of edge nodes; and verifying, by the central cloud, linkability of the tracing histories transmitted to the central cloud, storing the tracing histories, analyzing the tracing histories, and providing a data tracking function.

The data tracking method may include transmitting data to the first edge node by the end device, wherein, when data is generated, the end device transmits the data to the first edge node.

The data tracking method may include creating, by the first edge node, a tracing history with respect to a data transmission path.

The method may include distributing the data to a second edge node by the first edge node, and distributing the data to a third edge node by the first edge node.

The data tracking method may include creating, by a second edge node, a tracing history with respect to a data transmission path, and creating, by a third edge node, a tracing history with respect to a data transmission path.

The data tracking method may include transmitting, by the first edge node, the data and the tracing history to the central cloud, and transmitting, by a second edge node and a third edge node, tracing histories to the central cloud.

The data tracking method may include verifying, by the central cloud, linkability of the tracing histories and storing the tracing histories.

The tracing histories created by the first edge node and the plurality of edge nodes may each include a tracing history database (DB) table including generator identification (ID), a generation time, data ID, sender ID, receiver ID, and a reception time.

The data tracking method may further include receiving and storing, by at least one edge node, a copy of data made according to a data distribution policy determined by the central cloud.

In other example embodiments, a data tracking apparatus in an edge cloud environment includes at least one edge node communicating with an end device and a central cloud, the data tracking apparatus including a processor, and a memory storing at least one command to be executed by the processor, wherein the at least one command is configured to cause the processor to receive data from the end device by a first edge node, create, by the first edge node, a tracing history and distribute the data to a plurality of edge nodes to allow the plurality of edge nodes to create tracing histories, transmit the created tracing histories to the central cloud by the first edge node and the plurality of edge nodes, and verify, by the central cloud, linkability of the tracing histories transmitted to the central cloud, store the tracing histories, analyze the tracing histories, and provide a data tracking function.

The data distribution policy may include a policy for selecting, by the central cloud, at least one edge node in which a copy of the data is to be stored in consideration of storage spaces, activation states, and data processing speeds of the edge nodes and a tag of the data.

In other example embodiments, a method of verifying linkability of a tracing history in a data tracking method in an edge cloud environment includes (a) verifying generator ID, a generation time, and data ID, (b) verifying sender ID and receiver ID, and (c) verifying a timestamp, wherein, after operations (a), (b), and (c) are completed, it is determined that the verification of the linkability succeeds.

In operation (a), the generator ID, the generation time, and the data ID may be required to be the same for the same data, and when the generator ID, the generation time, and the data ID are different for the same data, it may be determined that the verification of the linkability fails.

Operation (b) may include searching for a tracing history including receiver ID identical to the sender ID of the tracing history among tracing histories except an initial tracing history in which sender ID and generator ID are the same.

Operation (c) may include setting a reception time of the tracing history to be greater than a receive time of a previous tracing history.

BRIEF DESCRIPTION OF DRAWINGS

Example embodiments of the present invention will become more apparent by describing example embodiments of the present invention in detail with reference to the accompanying drawings, in which.

DESCRIPTION OF EXAMPLE EMBODIMENTS

Figure 1A:
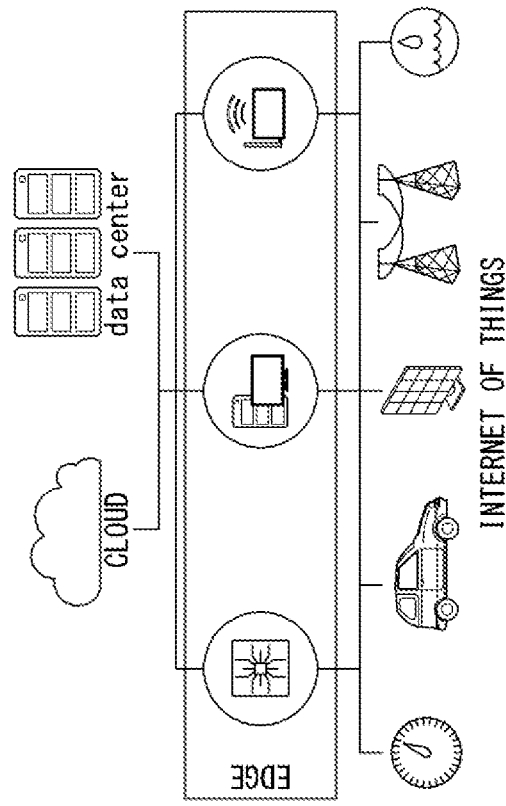
FIG. 1A is a conceptual diagram of edge computing for describing an existing edge cloud.

Various modifications may be made in the present invention and various embodiments may be implemented, and thus certain embodiments are illustrated in the accompanying drawings and described in the detailed description below. However, it should be understood that the present invention is not limited to particular embodiments and include all modifications, equivalents, and alternatives falling within the idea and scope of the present invention. In describing each drawing, similar reference numerals are used for similar elements.

Terms such as first, second, A, and B may be used to describe various components, but the components should not be limited by the terms. The terms are only used to distinguish one component from another. For example, a first component may be referred to as a second component without departing from the scope of the present invention, and similarly, a second component may also be referred to as a first component. The term "and/or" includes a combination of a plurality of related items described herein or any one of the plurality of related items.

When a component is referred to as being "coupled to" or "connected" to another component, it should be understood that the component may be directly coupled to or connected to another component but still another component may be interposed therebetween. In contrast, when a component is referred to as being "directly coupled to" or "directly connected" to another component, it should be understood that no component is interposed therebetween.

The terms used herein are only used to describe certain embodiments and are not intended to limit the present invention. As used herein, the singular expressions are intended to include plural forms as well, unless the context clearly dictates otherwise. It should be understood that the terms "comprise" and/or "comprising", when used herein, specify the presence of stated features, integers, steps, operations, elements, components, or a combination thereof but do not preclude the presence or addition of one or more features, integers, steps, operations, elements, components, or a combination thereof.

Unless defined otherwise, all terms used herein, including technical or scientific terms, have the same meaning as commonly understood by those of ordinary skill in the art to which the present invention pertains. Terms such as those defined in a commonly used dictionary should be interpreted as having meanings consistent with meanings in the context of related technologies and should not be interpreted as ideal or excessively formal meanings unless explicitly defined herein.

Hereinafter, embodiments of the present invention will be described in detail with reference to the accompanying drawings.

Figure 1B:
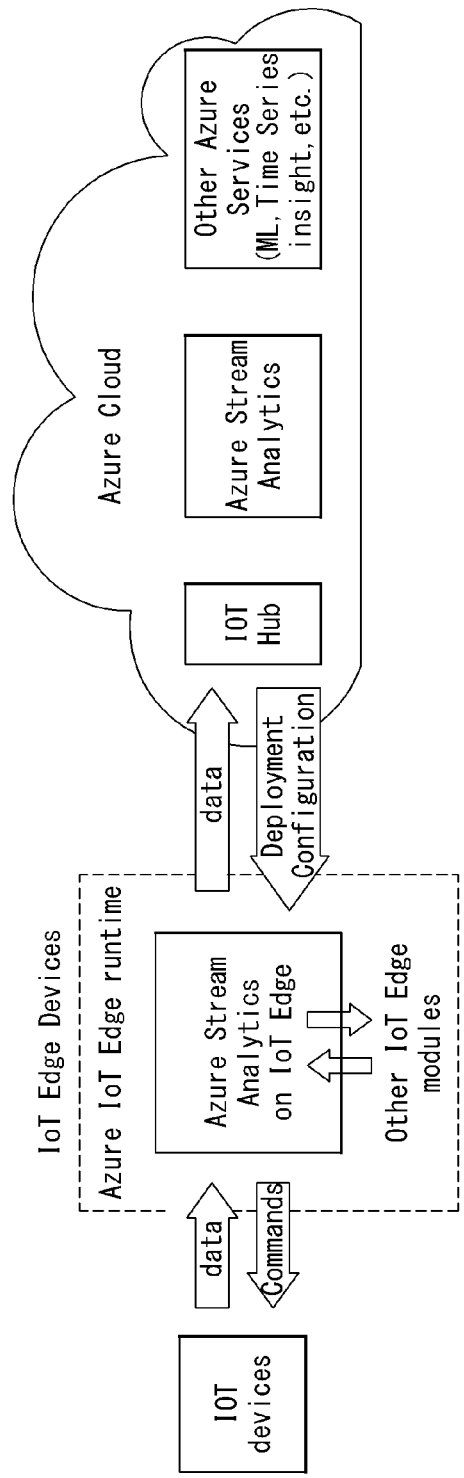
FIG. 1B is a conceptual diagram of an Azure-based Internet-of-Things (IoT) edge system for describing an existing edge cloud.

FIG. 1A is a conceptual diagram of edge computing for describing an existing edge cloud, and FIG. 1B is a conceptual diagram of an Azure-based Internet-of-Things (IoT) edge system for describing an existing edge cloud.

Referring to FIGS. 1A and 1B, the edge cloud is a technique for providing an information service to a terminal using edge computing technology used as data that has emerged as a core element of the 4$^{th}$ industrial revolution and that has been used in various ways. The edge computing technology has been introduced to provide a service by analyzing and processing data at a position closer to a terminal than a remote server.

Edge computing refers to computing technology using an edge cloud.

The edge cloud is differentiated from a remote cloud and provides an information service to a terminal using the edge computing technology.

When data between edge clouds is requested, the request is processed by a central cloud which is a central processing server.

Data may be distributed and stored by a data distribution and storing device that includes at least one edge node communicating with an end device and a central cloud.

Figure 2A:
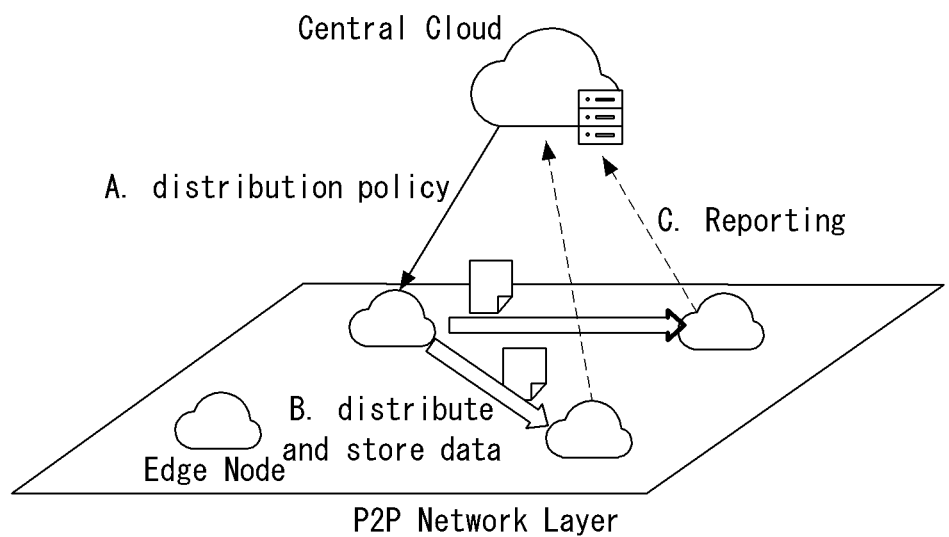
FIG. 2A is a diagram illustrating an example of a method of distributing and storing data by edge nodes.
Figure 2B:
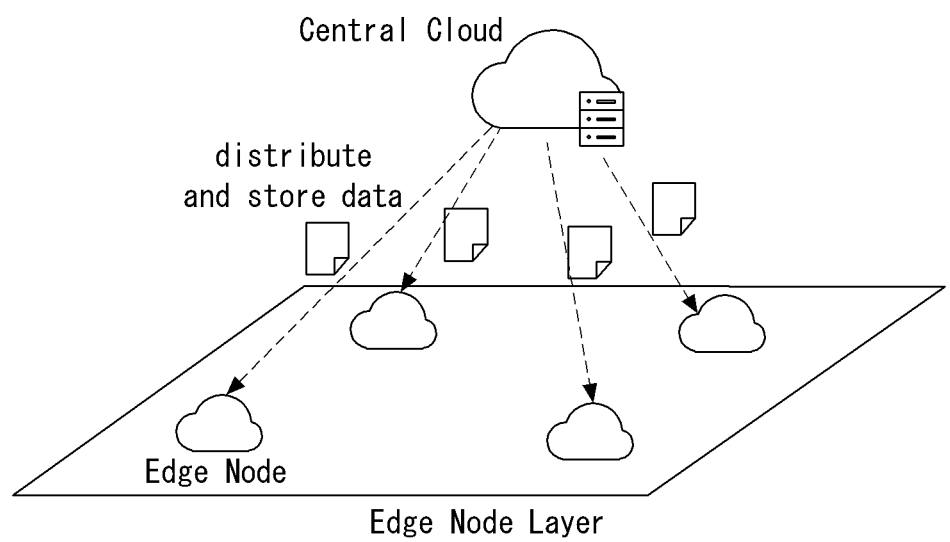
FIG. 2B is a diagram illustrating an example of a method of distributing and storing data by a central cloud.

FIG. 2A is a diagram illustrating an example of a method of distributing and storing data by edge nodes, and FIG. 2B is a diagram illustrating an example of a method of distributing and storing data by a central cloud.

Referring to FIGS. 2A and 2B, the present invention relates to a method of distributing and storing data, in which data is distributed and stored by edge nodes and data is distributed and stored by a central cloud.

Data is distributed and stored directly by edge nodes when a network is formed between the edge nodes. In this case, an edge node may receive a data distribution policy from the central cloud and distribute data to neighboring edge nodes to store the data therein. An edge node receiving the data may transmit a data reception result to the central cloud. When the data is distributed and stored directly by the edge nodes, a data processing burden of the central cloud may decrease.

Data is distributed and stored by the central cloud when a network is not formed between edge nodes, or it is difficult to transmit data between the edge nodes. In this case, the central cloud may distribute the data to the edge nodes to be stored in the edge nodes according to the data distribution policy.

The data distribution policy may include a policy of selecting, by the central cloud, at least one edge node in which a copy of the data is to be stored in consideration of storage spaces, activation states, and data processing speeds of the edge nodes and a tag of the data.

In addition, the data distribution policy may include a policy of selecting, by the central cloud, at least one edge node (available copy) in which the copy of the data is to be stored and an edge node (enable copy) immediately accessible to the copy of the data among the at least one edge node (available copy).

Figure 3A:
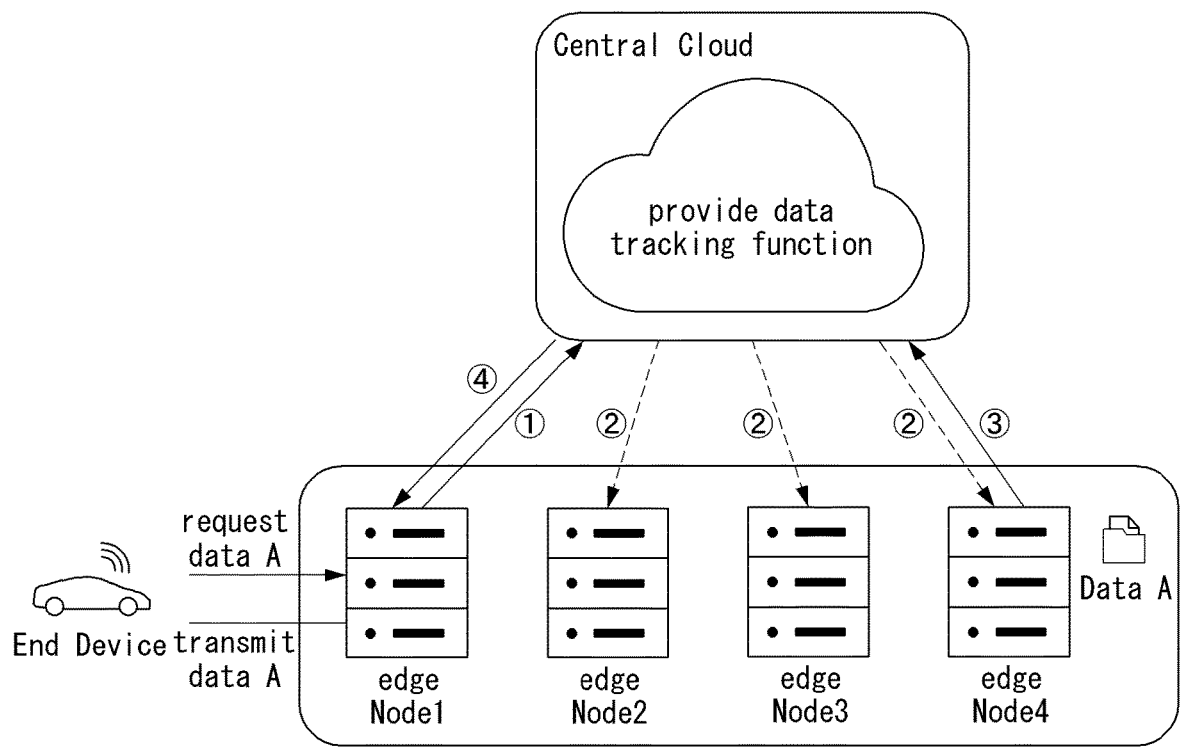
FIG. 3A is a conceptual diagram for describing a process of tracking data in an edge cloud environment when a data tracking technique is absent.
Figure 3B:
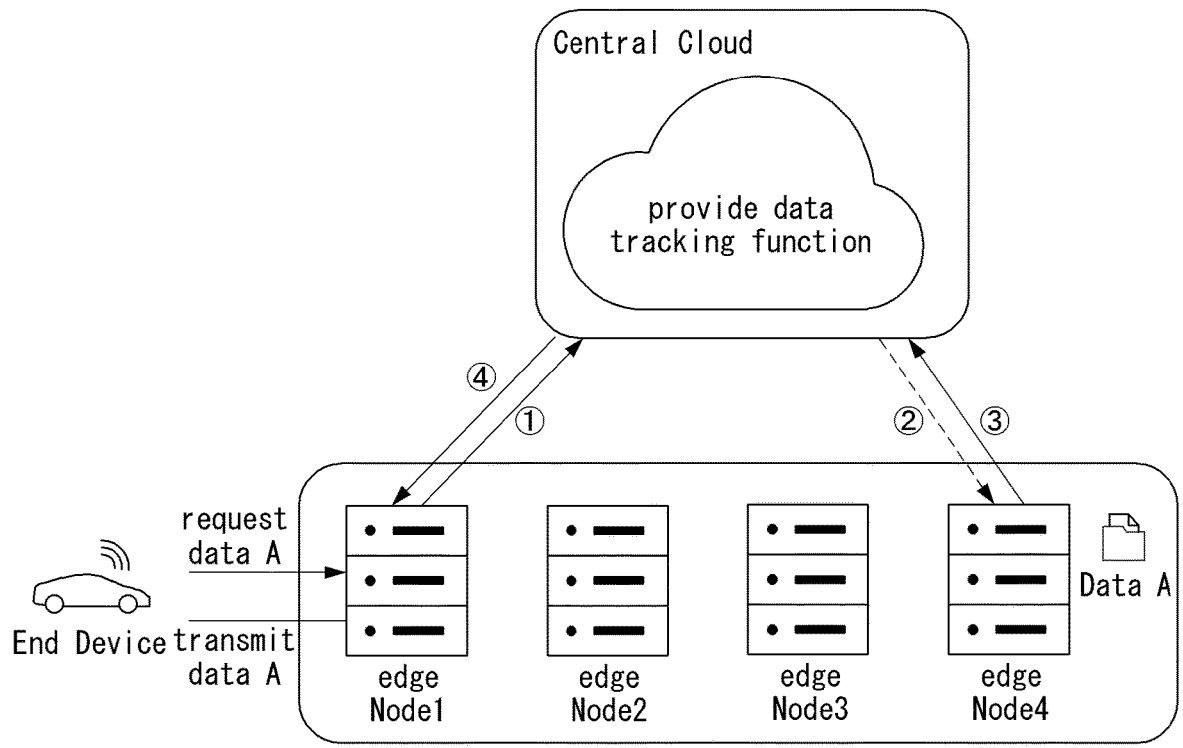
FIG. 3B is a conceptual diagram for describing a process of tracking data in the edge cloud environment using the data tracking technique.

FIG. 3A is a conceptual diagram for describing a process of tracking data in an edge cloud environment when a data tracking technique is absent, and FIG. 3B is a conceptual diagram for describing a process of tracking data in the edge cloud environment using the data tracking technique.

Referring to FIGS. 3A and 3B, when data A that an end device desires is not stored in a first edge node adjacent to the end device, an edge node requests the central cloud to provide the data A, and the central cloud asks a plurality of edge nodes about whether the data A is stored therein. In this case, unnecessary network traffic occurs, and network traffic increases as an edge network environment becomes larger.

When a fourth edge node storing the data A transmits the data A to the central cloud, the central cloud transmits the data A to the end device.

Figure 4:
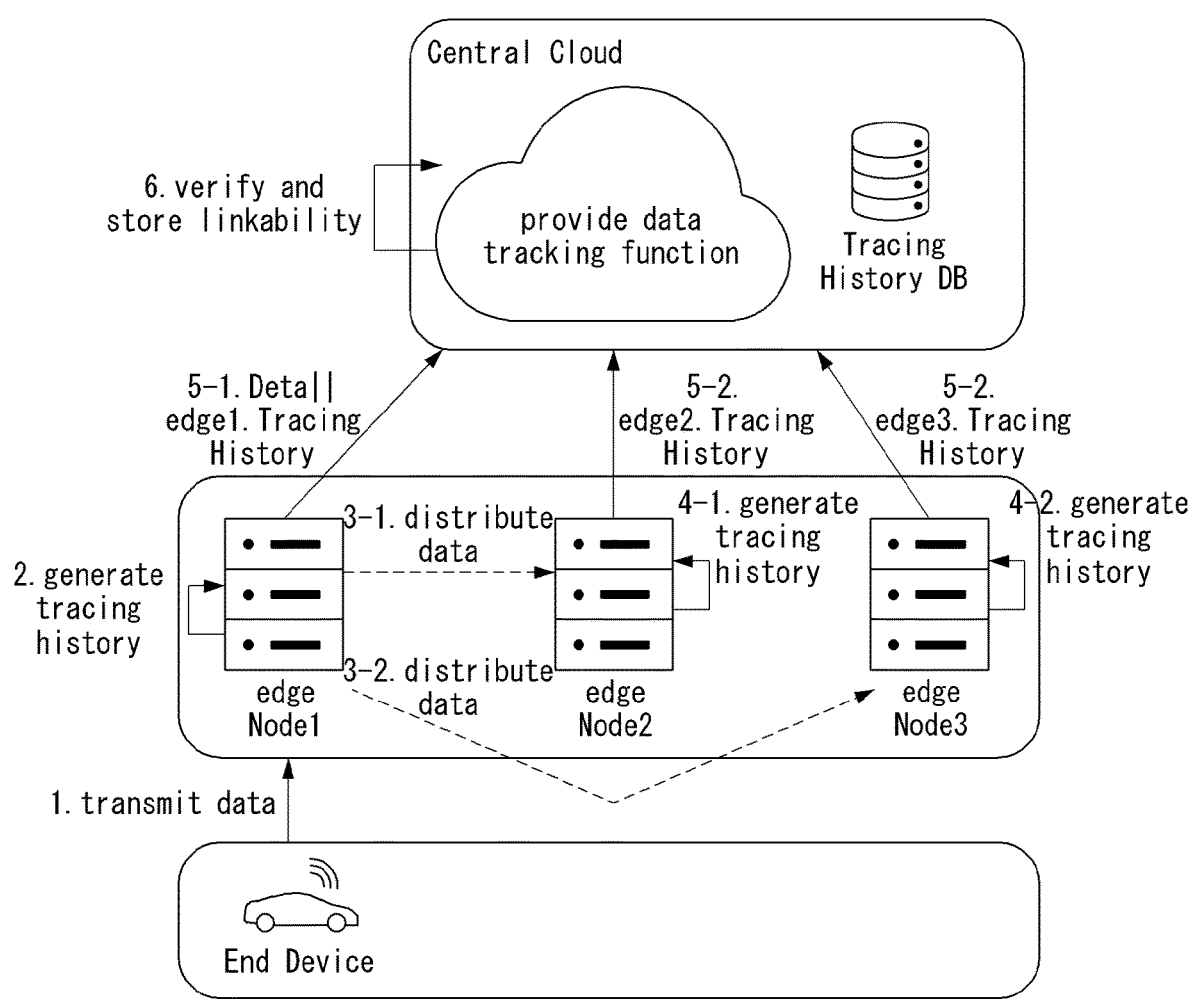
FIG. 4 is a configuration diagram of a data tracking apparatus in an edge cloud environment according to an embodiment of the present invention.

FIG. 4 is a configuration diagram of a data tracking apparatus in an edge cloud environment according to an embodiment of the present invention.

Referring to FIG. 4, in the edge cloud environment of the embodiment of the present invention, first, the data tracking apparatus defines a tracing history database (DB) table for tracking data. The tracing history DB table provides definitions of sender ID, receiver ID, and the like.

Next, a central cloud collects and stores all tracing histories. The central cloud receives tracing histories from all edge nodes. The tracing histories are stored after linkability thereof is verified.

Next, the central cloud analyzes the tracing history DB table and provides a data tracking function.

Figure 5:
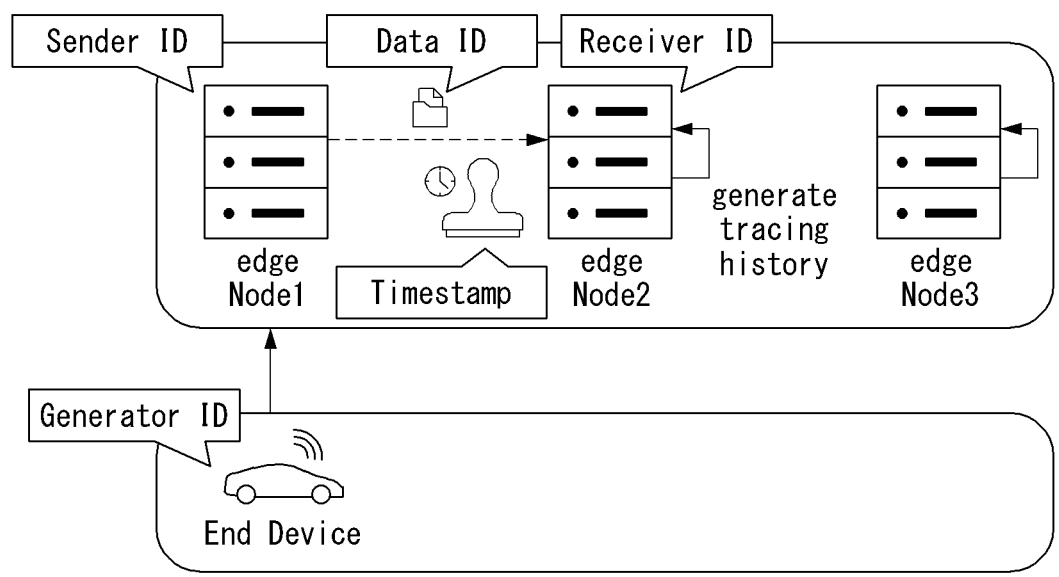
FIG. 5 is a conceptual diagram for describing generating a tracing history by a data tracking apparatus in an edge cloud environment according to an embodiment of the present invention.

FIG. 5 is a conceptual diagram for describing generating a tracing history by a data tracking apparatus in an edge cloud environment according to an embodiment of the present invention.

Referring to FIG. 5, the data tracking apparatus in the edge cloud environment according to the embodiment of the present invention is configured to fix problems that may occur in the edge cloud environment when a data tracking technique is absent and prevent a unnecessary increase in network traffic and hacking and exposure due to the absence of a technique for distributing, storing, and managing data.

In order to define a main concept of a technique according to the present invention, and preferably, to define a tracing history DB table for data tracking, sender ID, receiver ID, etc. will be defined below.

A central cloud collects and stores all tracing histories.

The central cloud receives tracing histories from all edge nodes. The tracing histories are stored after linkability thereof is verified.

The central cloud analyzes the tracing history DB table and provides a data tracking function.

Figure 6:
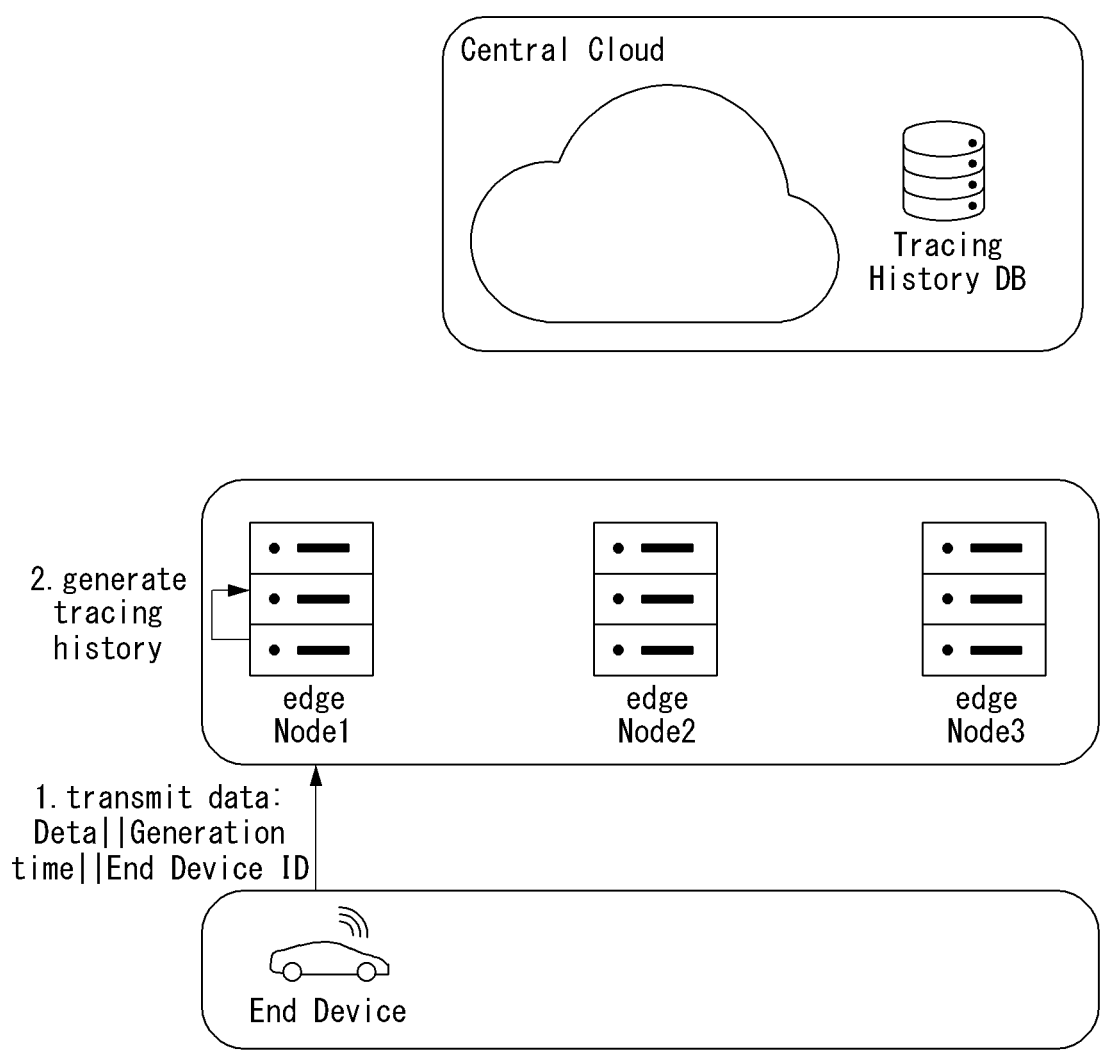
FIG. 6 illustrates an example of generating a tracing history according to an embodiment of the present invention.

FIG. 6 illustrates an example of generating a tracing history according to an embodiment of the present invention.

Referring to FIG. 6, in order to define a tracing history DB table, an edge node receiving data creates a tracing history.

Table 1 below is a tracing history DB table of an embodiment of the present invention.

TABLE 1

| Tracing History | Field | Description |
|---|---|---|
| | Generator ID | Data Generator ID |
| | Generation Time | Data Generation time |
| | Data ID | Data ID |
| | Sender ID | Data Sender ID |
| | Receiver ID | Data Receiver ID |
| | Receive Time | Data Receive Time |

However, IDs are allocated in advance to an end device and an edge node.

Figure 7:
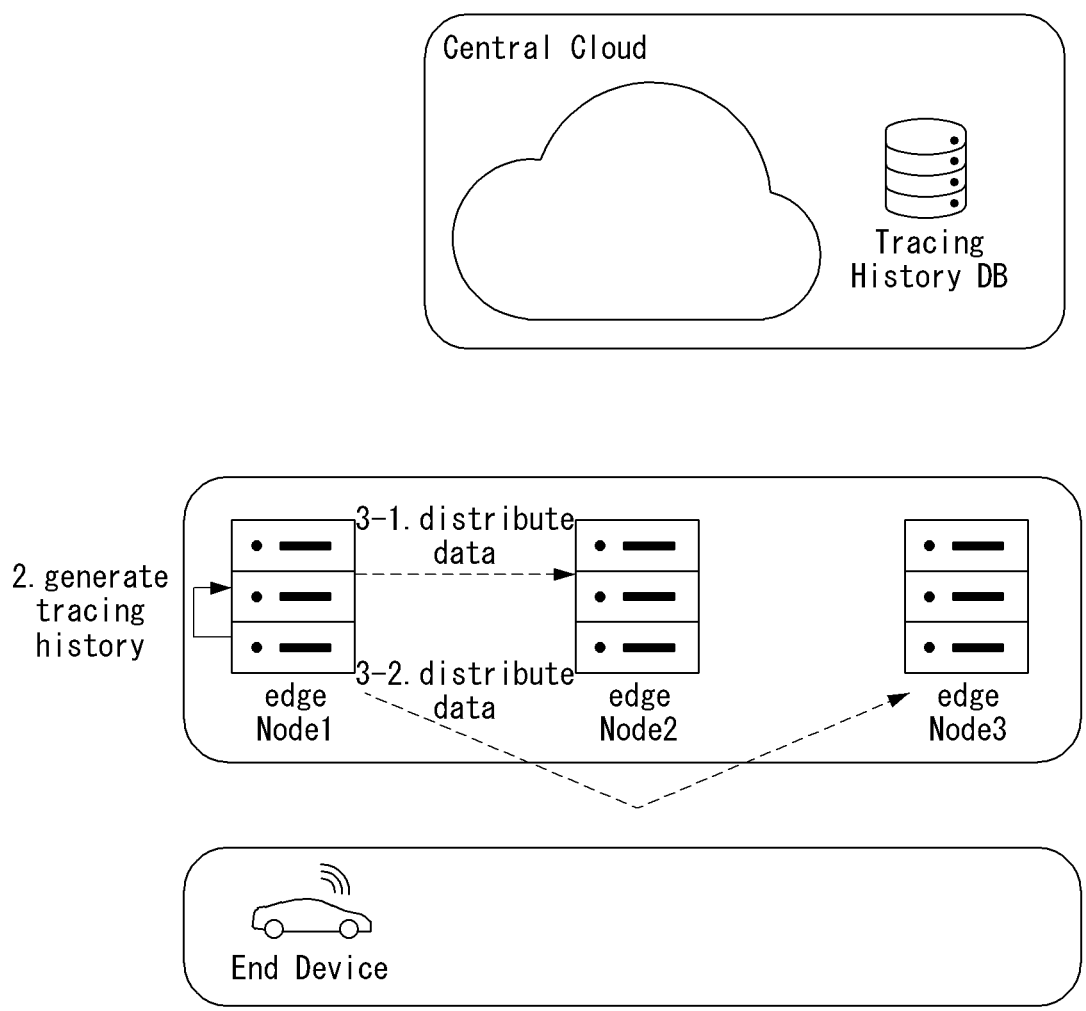
FIG. 7 is a conceptual diagram for describing a data registration process for tracking data by a data tracking apparatus in an edge cloud environment according to an embodiment of the present invention.

FIG. 7 is a conceptual diagram for describing a data registration process for tracking data by a data tracking apparatus in an edge cloud environment according to an embodiment of the present invention.

FIG. 7 illustrates a data registration process for tracking data by a data tracking apparatus in an edge cloud environment according to an embodiment of the present invention.

In operation S100, an end device transmits data to a first edge node (S100). The end device transmits data to an edge node when the end device generates data. During the transmission of the data, ID of the end device and information about a time when data was generated are transmitted with the data.

In operation S200, the first edge node creates a tracing history with respect to a data transmission path.

Table 2 below shows an example of a tracing history.

TABLE 2

| Tracing History | Field | Value |
| --- | --- | --- |
| | Generator ID | Device 1 ID |
| | Generation Time | 2021_10_28T13_20 |
| | Data ID | Data 1 ID |
| | Sender ID | Device 1 ID |
| | Receiver ID | Edge 1 ID |
| | Receive Time | 2021_10_28T13_21 |

Figure 8:
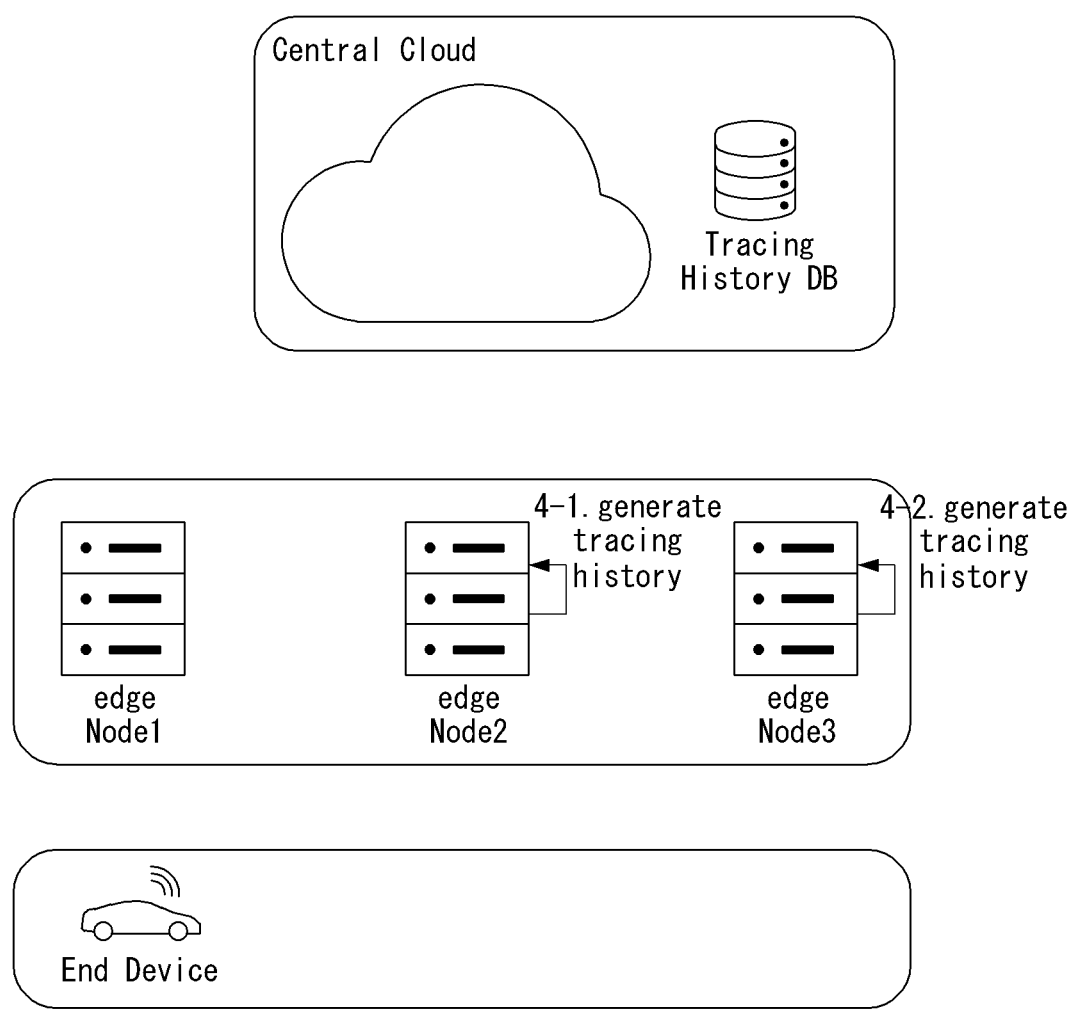
FIG. 8 is a conceptual diagram for describing a data registration process for tracking data by a data tracking apparatus in an edge cloud environment according to an embodiment of the present invention.

FIG. 8 is a conceptual diagram for describing a data registration process for tracking data by a data tracking apparatus in an edge cloud environment according to an embodiment of the present invention FIG. 8 illustrates a data registration process for tracking data by a data tracking apparatus in an edge cloud environment according to the embodiment of the present invention.

In operation S310, a first edge node distributes data to a second edge node (S310).

In operation S320, the first edge node distributes data to a third edge node (S320).

In an embodiment of the present invention, data is distributed according to a distribution policy of a central cloud. The distribution policy of the central cloud is subject to a distribution policy disclosed in "Method and Apparatus for Distributing and Storing Data" (Related art document 1).

The central cloud periodically transmits the distribution policy disclosed in Related art document 1 to all edge nodes.

The distribution policy of the central cloud is determined by a status of an edge node, and the status of the edge node is monitored in real time by the central cloud.

Figure 9:
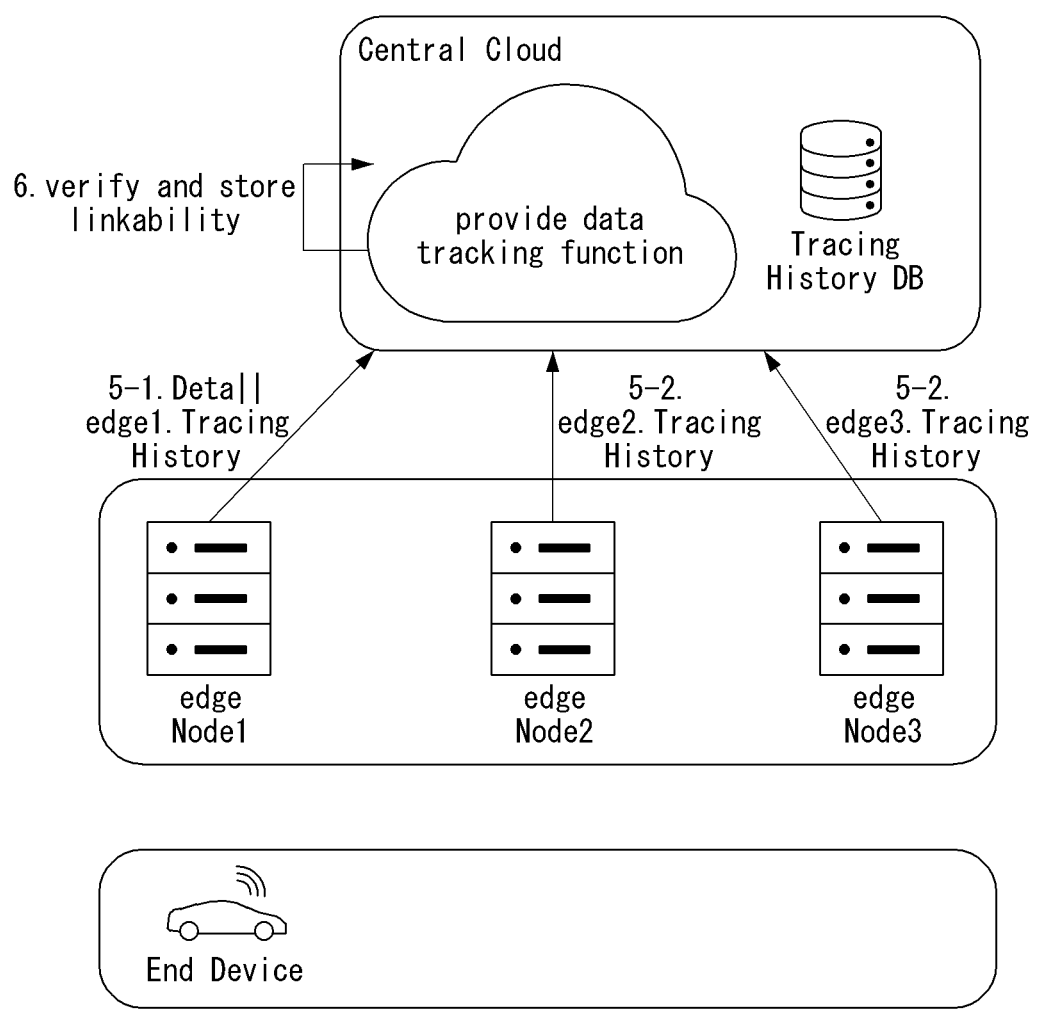
FIG. 9 is a conceptual diagram for describing a data registration process for tracking data by a data tracking apparatus in an edge cloud environment according to an embodiment of the present invention.

FIG. 9 is a conceptual diagram for describing a data registration process for tracking data by a data tracking apparatus in an edge cloud environment according to an embodiment of the present invention.

Referring to FIG. 9, in the edge cloud environment of the embodiment of the present invention, in operation 410, a second edge node creates a tracing history with respect to a data transmission path.

Table 3 below shows an example of a tracing history.

TABLE 3

| Tracing History | Field | Value |
| --- | --- | --- |
| | Generator ID | Device 1 ID |
| | Generation Time | 2021_10_28T13_20 |
| | Data ID | Data 1 ID |

TABLE 3-continued

| Tracing History | Field | Value |
| --- | --- | --- |
| | Sender ID | Edge 1 ID |
| | Receiver ID | Edge 2 ID |
| | Receive Time | 2021_10_28T13_22 |

In operation 420, a third edge node creates a tracing history with respect to a data transmission path.

Table 4 below shows an example of a tracing history of the present invention.

TABLE 4

| Tracing History | Field | Value |
| --- | --- | --- |
| | Generator ID | Device 1 ID |
| | Generation Time | 2021_10_28T13_20 |
| | Data ID | Data 1 ID |
| | Sender ID | Edge 1 ID |
| | Receiver ID | Edge 3 ID |
| | Receive Time | 2021_10_28T13_23 |

Figure 10:
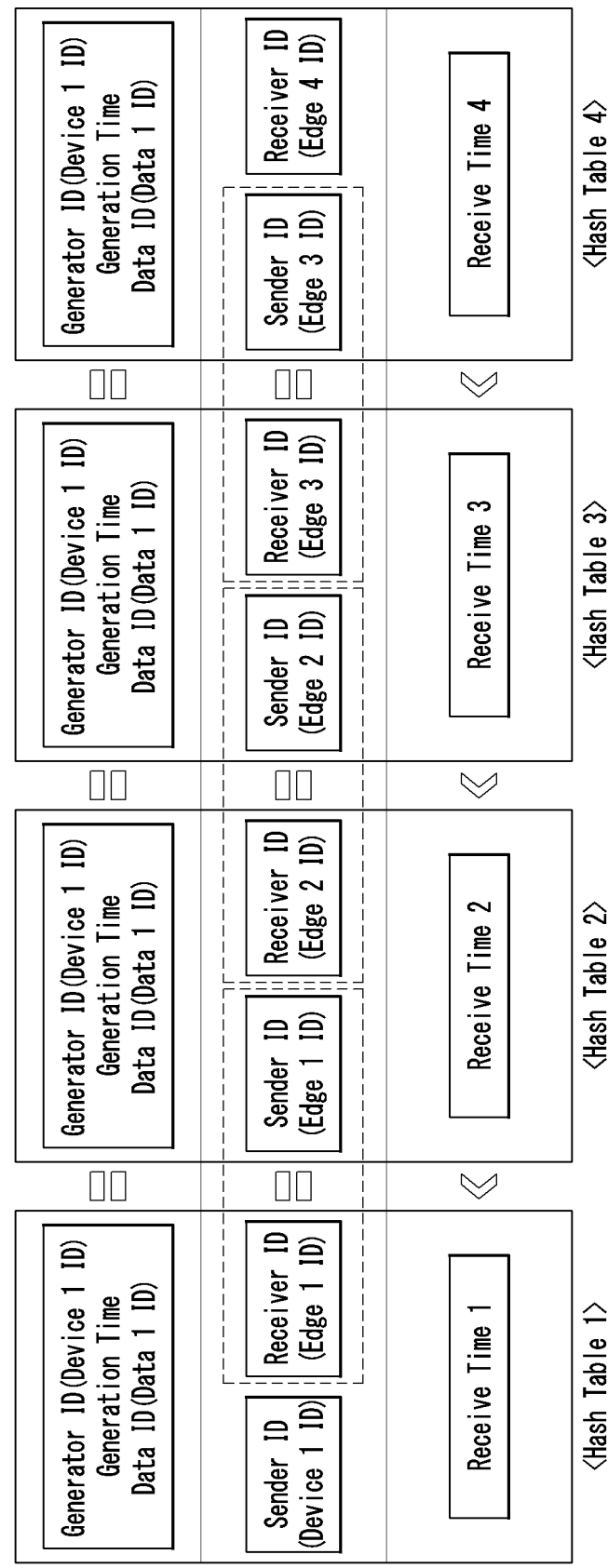
FIG. 10 is a conceptual diagram for describing a data registration process for tracking data by a data tracking apparatus in an edge cloud environment according to an embodiment of the present invention.

FIG. 10 is a conceptual diagram for describing a data registration process for tracking data by a data tracking apparatus in an edge cloud environment according to an embodiment of the present invention.

Referring to FIG. 10, in an edge cloud environment of the embodiment of the present invention, in operation 510, a first edge node transmits data and a tracing history to a central cloud.

In operation 520, a second edge cloud and a third edge cloud transmit tracing histories to the central cloud.

In operation 600, the central cloud verifies linkability of the tracing histories and stores the tracing histories.

The central cloud receiving the tracing histories should verify the linkability thereof. It is defined that linkability is satisfied when there is a tracing history for the same data before the reception of a current tracing history. However, when original data is uploaded, linkability is not satisfied and thus is not verified when sender ID and generator ID of the central cloud are identical to each other.

When linkability is not satisfied, waiting for a certain time period is required. When no missing tracing history is received even after the certain time period, the data is discarded and a request to discard the data is transmitted to edge nodes.

When linkability is satisfied, the received tracing histories are stored in a tracing history DB of the central cloud.

Figure 11:
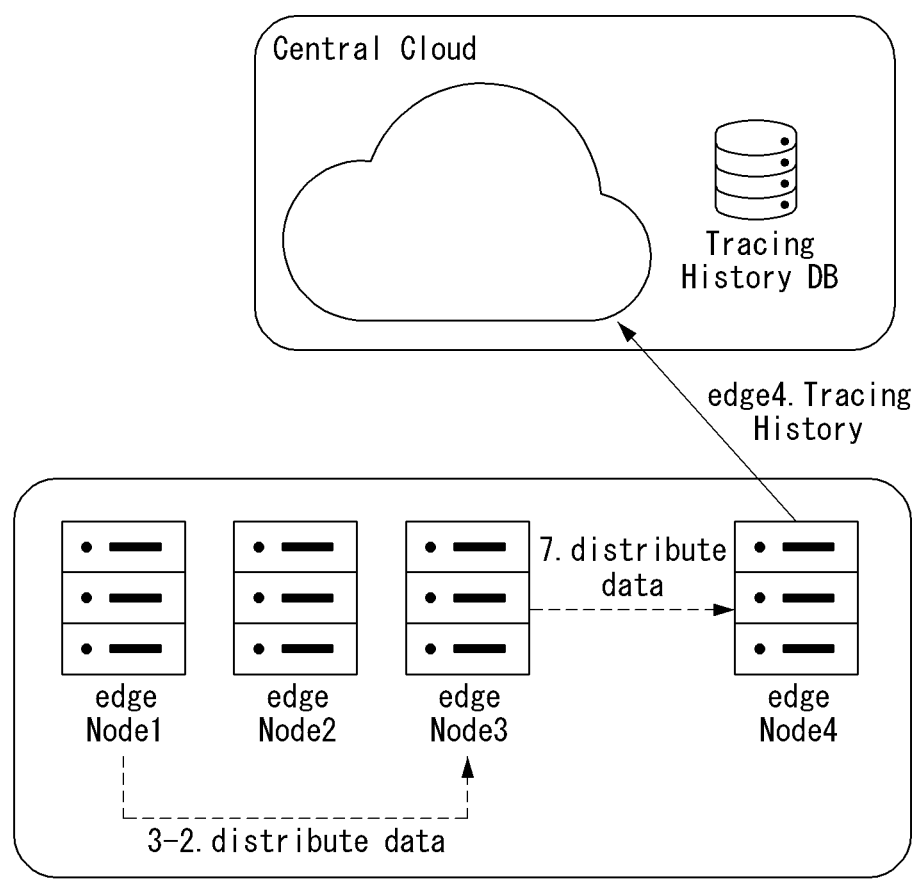
FIG. 11 is a conceptual diagram for describing a data registration process for tracking data by a data tracking apparatus in an edge cloud environment according to an embodiment of the present invention.

FIG. 11 is a conceptual diagram for describing a data registration process for tracking data by a data tracking apparatus in an edge cloud environment according to an embodiment of the present invention.

Referring to FIG. 11, a method of verifying linkability of a tracing history by a data tracking apparatus in an edge cloud environment according to the embodiment of the present invention includes operations S1000 to S3000 to be described below.

In operation S1000, a generator ID, a generation time, and data ID are verified (S1000). The generator ID, the generation time, and the data ID should be the same for the same data. When the generator ID, the generation time, and the data ID are different for the same data, verification of linkability fails.

In operation S2000, sender ID and receiver ID are verified (S2000). Among initial tracing history in which sender ID and generator ID are the same, the remaining tracing history except for initial tracing history should search for tracing history with the receiver ID identical to the sender ID of the tracing history.

In operation S3000, a timestamp is verified (S3000). A receive time of the tracing history should be greater than a receive time of a previous tracing history.

When all of the verifications in operations S1000 to S3000 are completed, it is determined that the verification of linkability is successful.

Figure 12:
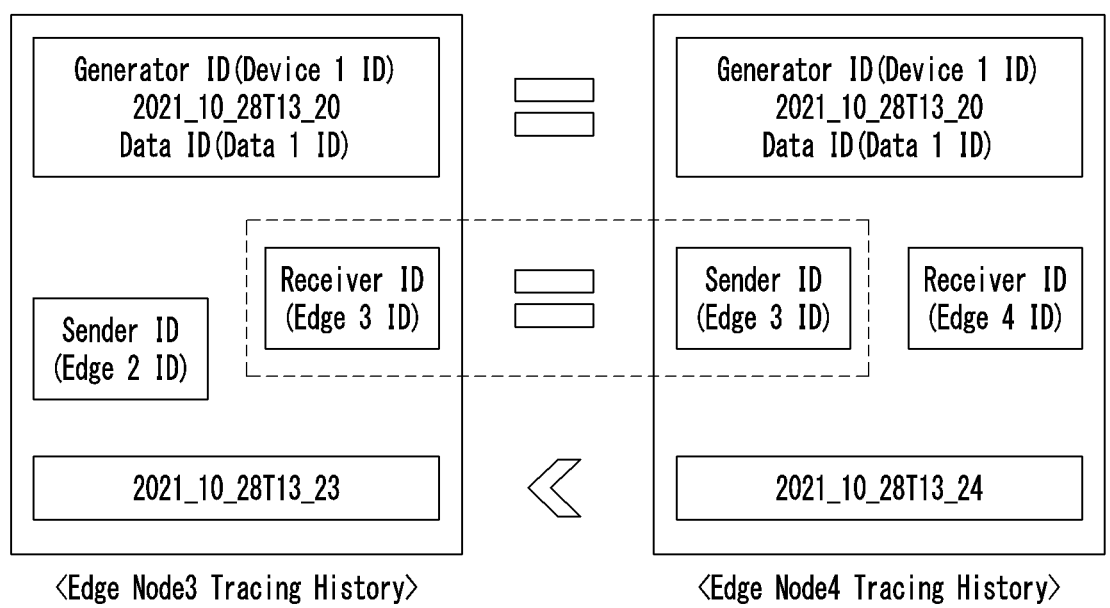
FIG. 12 is a conceptual diagram for describing a data registration process for tracking data by a data tracking apparatus in an edge cloud environment according to an embodiment of the present invention.

FIG. 12 is a conceptual diagram for describing a data registration process for tracking data by a data tracking apparatus in an edge cloud environment according to an embodiment of the present invention.

Referring to FIG. 12, in operation S700, in the edge cloud environment of the embodiment of the present invention, a data tracking apparatus distributes new data (S700).

A fourth edge node creates and transmits a tracing history. Table 5 below shows an example of a tracing history.

TABLE 5

| Tracing History | Field | Value |
| --- | --- | --- |
| | Generator ID | Device 1 ID |
| | Generation Time | 2021_10_28T13_20 |
| | Data ID | Data 1 ID |
| | Sender ID | Edge 3 ID |
| | Receiver ID | Edge 4 ID |
| | Receive Time | 2021_10_28T13_24 |

A central cloud verifies linkability.

Figure 13:
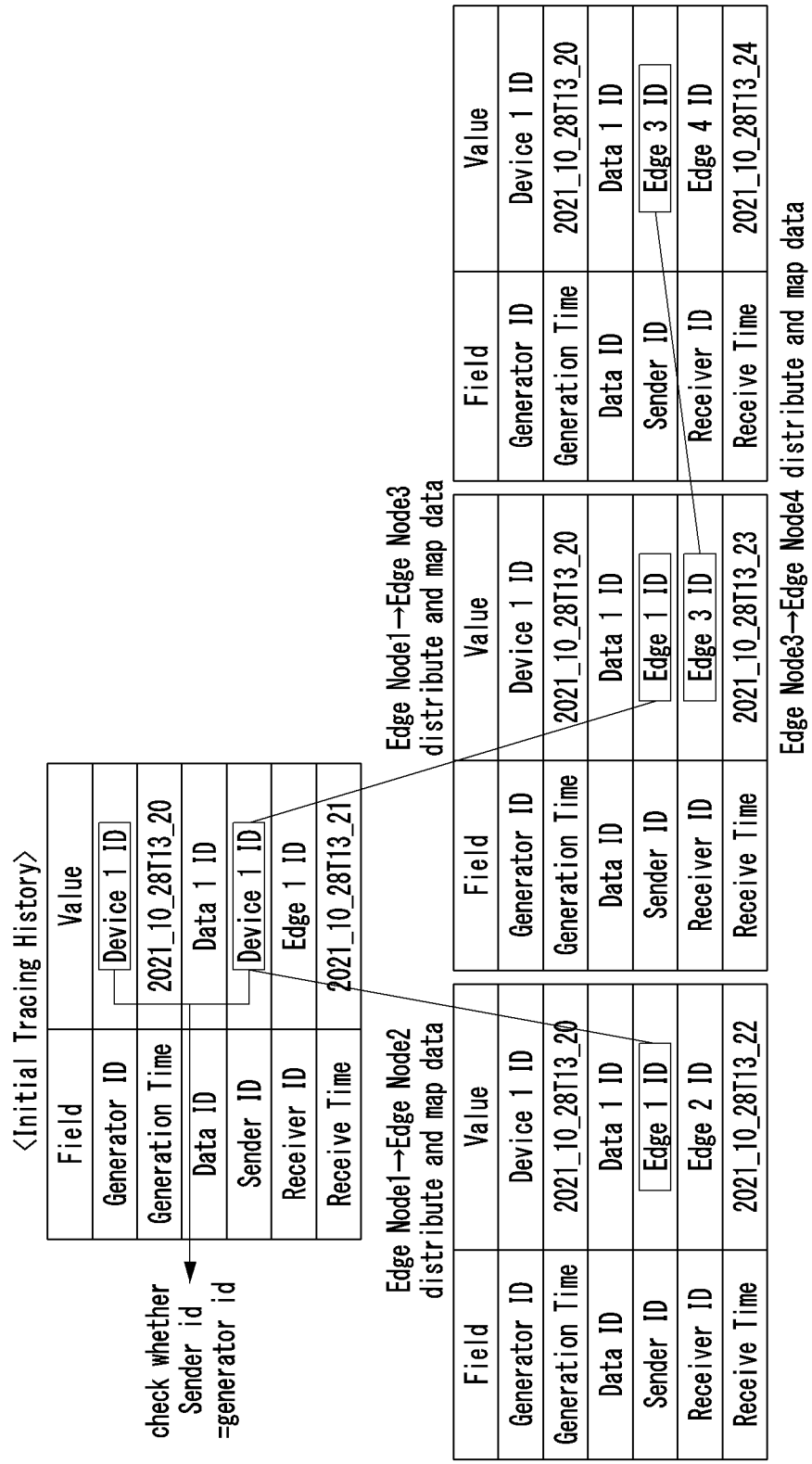
FIG. 13 is a conceptual diagram for describing a data registration process for tracking data by a data tracking apparatus in an edge cloud environment according to an embodiment of the present invention.

FIG. 13 is a conceptual diagram for describing a data registration process for tracking data by a data tracking apparatus in an edge cloud environment according to an embodiment of the present invention.

Referring to FIG. 13, in the edge cloud environment according to the embodiment of the present invention, a central cloud of a data tracking apparatus may perform a data tracking process as described below.

Data tracking is performed based on a tracing history, the linkability of which is successfully verified.

A tracing history table is arranged based on timestamps of tracing histories including the same data ID.

In the tracing history data, sender ID is the same as generator ID, and the corresponding tracing history table is defined as an initial tracing history.

Thereafter, a data transmission path is recorded by connecting the tracing histories.

Figure 14:
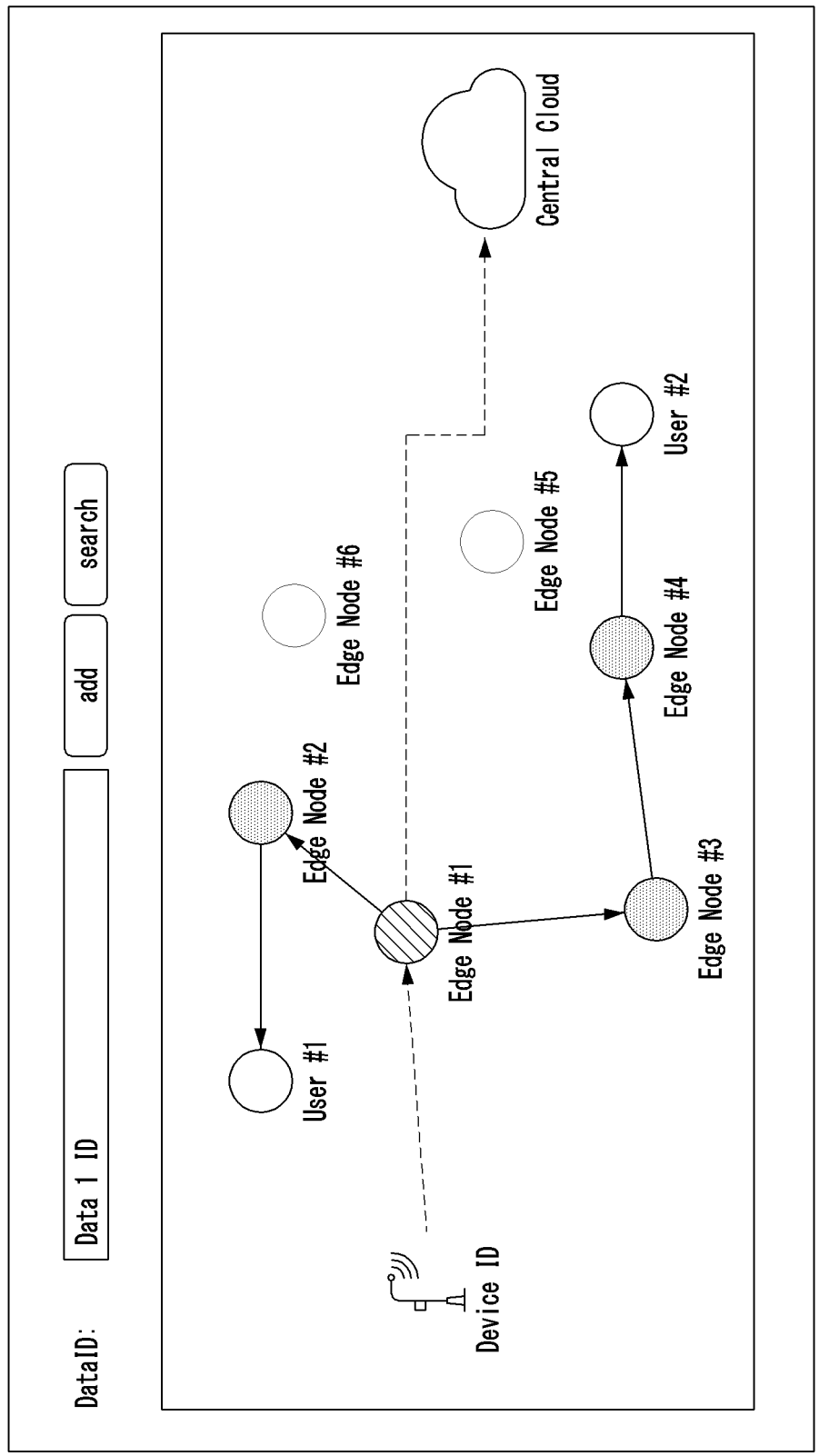
FIG. 14 is a conceptual diagram for describing a data tracking screen of a data tracking apparatus in an edge cloud environment according to an embodiment of the present invention.

FIG. 14 is a conceptual diagram for describing a data tracking screen of a data tracking apparatus in an edge cloud environment according to an embodiment of the present invention.

Referring to FIG. 14, in a data tracking apparatus in an edge cloud environment according to an embodiment of the present invention, a data tracking apparatus may display a data tracking result.

Figure 15:
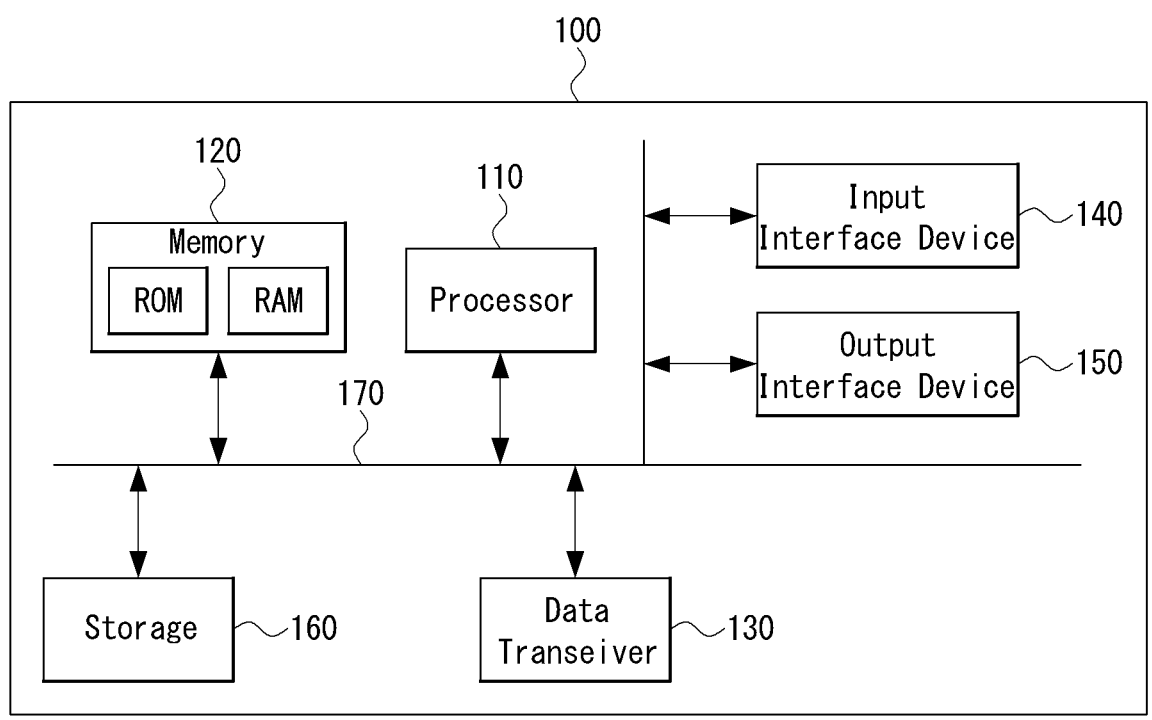
FIG. 15 is a block diagram of a data tracking apparatus in an edge cloud environment according to an embodiment of the present invention.

FIG. 15 is a block diagram of a data tracking apparatus in an edge cloud environment according to an embodiment of the present invention.

Referring to FIG. 15, a data tracking apparatus 100 in the edge cloud environment according to the embodiment of the present invention may include a processor 110, a memory 120 for storing at least one command to be executed through the processor 110 and a result of executing a command, and a transceiver device 130 connected to a network to establish communication.

The data tracking apparatus 100 in the edge cloud environment may further include an input interface device 140, an output interface device 150, a storage device 160, and the like. The components included in the data tracking apparatus 100 in the edge cloud environment may be connected to each other through a bus 170 to communicate with each other.

The processor 110 may execute a program command stored in at least one of the memory 120 and the storage device 160. The processor 410 may be a central processing unit (CPU), a graphics processing unit (GPU), or a dedicated processor configured to perform methods according to embodiments of the present invention. Each of the memory 120 and the storage device 160 may be configured with at least one of a volatile storage medium and a nonvolatile storage medium. For example, the memory 120 may include at least one of a read only memory (ROM) and a random access memory (RAM).

The storage device 160 may classify and store data distribution policies determined by a central cloud according to data, and classify and store data included in each edge node on the basis of a tag assigned to the data according to features of the data.

Here, the at least one command may include commands instructing a data tracking apparatus in an edge cloud environment, which includes at least one edge node for communication with an end device and a central cloud, to receive, by a first edge node, data from the end device, create tracing histories by a plurality of edge nodes receiving data when the first edge node creates a tracing history and distributes the data to a plurality of edge nodes, transmit the created tracing histories to a central cloud by the first edge node and the plurality of edge nodes, and analyze, by the central cloud, the tracing histories transmitted thereto and provide a data tracking function.

According to an embodiment of the present invention, a tracing history DB table for tracking data is defined, an initial tracing history in which sender ID and generator ID are the same is defined, and all edge nodes receiving data create a tracing history and transmit the tracing history to the central cloud so as to define a tracing history DB table, thereby preventing an unnecessary increase in network traffic for tracking data.

The central cloud defines a method of collecting and storing tracing histories, defines a method of verifying linkability, stores a tracing history after verifying linkability of the tracing history, and does not provide a data tracking function with respect to data from an unreliable source, thereby enhancing security.

A data tracking method can be defined using a tracing history and a data tracking function can be provided using a link between sender ID and receiver ID of the tracing history so that unnecessary increase in network traffic can be prevented and a lifecycle of data can be easily managed by tracking the data.

Operations of the method according to the embodiment of the present invention can be embodied as a computer-readable program or code in a computer-readable recording medium. The computer-readable recording medium include all types of recording media for storing information readable by a computer system. The computer-readable recording media may be distributed over computer systems connected through a network so that a computer-readable program or code may be stored and executed in a distribution manner.

The computer-readable recording medium may include a hardware device, such as ROM, RAM, and flash memory, which is specially configured to store and execute program instructions. The program instructions may include not only machine language code such as that produced by a compiler but also high-level language code executable by a computer using an interpreter or the like.

Some aspects of the present invention have been described above in the context of an apparatus but may be described in the context of a method corresponding thereto. Here, blocks or the apparatus correspond to operations of the method or characteristics of the operations of the method. Similarly, aspects of the present invention described above in the context of a method may be described using blocks or items corresponding thereto or characteristics of an apparatus corresponding thereto. Some or all of the operations of the method may be performed, for example, by (or using) a hardware device such as a microprocessor, a programmable computer or an electronic circuit. In some embodiments, at least one of most important operations of the method may be performed by such an apparatus.

In embodiments, a programmable logic device (e.g., a field-programmable gate array) may be used to perform some or all of functions of the methods described herein. In embodiments, the field-programmable gate array may be operated with a microprocessor to perform one of the methods described herein. In general, the methods are preferably performed by a certain hardware device.

While example embodiments of the present invention have been described above with respect to example embodiments thereof, it would be understood by those of ordinary skill in the art that various changes and modifications may be made without departing from the technical conception and scope of the present invention defined in the following claims.

What is claimed is:

1. A data tracking method performed in an edge cloud environment including a plurality of edge nodes each communicating with an end device and a central cloud, the data tracking method comprising:
   receiving, by a first edge node, data from the end device, creating, a tracing history for the data to transmit to the central cloud, and generating a copy of the data to distribute to at least one edge node determined according to a data distribution policy determined by the central cloud;
   receiving, by the at least one edge node, the copy of the data and creating a tracing history for the copy of the data to transmit to the central cloud;
   receiving, by the central cloud, the tracing history for the copy of the data and verifying linkability of the tracing histories to store the tracing histories; and
   analyzing, by the central cloud, stored tracing histories to provide a data tracking function based on the stored tracing histories,
   wherein the data distribution policy comprises a policy for selecting the at least one edge node in which the copy of the data is to be stored in consideration of storage spaces, activation states, and data processing speeds of the edge nodes and a tag of the data.

2. The data tracking method of claim 1, wherein each of the tracing histories created by the first edge node and the at least one edge node comprises a generator identification (ID), a generation time, a data ID, a sender ID, a receiver ID, and a receive time.

3. The data tracking method of claim 2, wherein receiving, by the central cloud, the tracing history for the copy of the data and verifying linkability of the tracing histories to store the tracing histories, comprises:
   determining that the linkability is satisfied between a first and second tracing histories when a generator ID, a generation time, and a data ID of the first tracing history are the same as a generator ID, a generation time, and a data ID of the second tracing history, respectively, a receiver ID of the first tracing history is the same as a sender ID of the second tracing history, and a receive time of the second tracing history is greater than a receive time of the first tracing history.

4. In an edge cloud environment including a plurality of edge nodes each communicating with an end device and a central cloud, a data tracking apparatus implemented in the central cloud comprising:
   a processor; and
   a memory storing at least one command to be executed by the processor,
   wherein the at least one command is configured to cause the processor to:
   determine a data distribution policy to be used by the plurality of edge nodes for distributing a copy of data and provide the data distribution policy to the plurality of edge nodes;
   receive a tracing history for data from a first edge node receiving the data from the end device, creating the tracing history for the data, and generating a copy of the data to distribute to at least one edge node determined according to the data distribution policy;
   receive a tracing history for the copy of the data from the at least one edge node receiving the copy of the data and verify linkability of the tracing histories to store the tracing histories; and
   analyze stored tracing histories to provide a data tracking function based on the stored tracing histories,
   wherein the data distribution policy comprises a policy for selecting the at least one edge node in which the copy of the data is to be stored in consideration of storage spaces, activation states, and data processing speeds of the edge nodes and a tag of the data.

5. The data tracking apparatus of claim 4, wherein each of the tracing histories received from the first edge node and the at least one edge node comprises a generator ID, a generation time, a data ID, a sender ID, a receiver ID, and a receive time.

6. The data tracking apparatus of claim 5, wherein the at least one command causing the processor to verify the linkability of the tracing histories comprises commands causing the processor to:
   determine that the linkability is satisfied between a first and second tracing histories when a generator ID, a generation time, and a data ID of the first tracing history are the same as a generator ID, a generation time, and a data ID of the second tracing history, respectively, a receiver ID of the first tracing history is the same as a sender ID of the second tracing history, and a receive time of the second tracing history is greater than a receive time of the first tracing history.

* * * * *